INVENTOR.
LUKE M. HARVEY
BY James To Davis Jr.
HIS ATTORNEY

3,436,575
Patented Apr. 1, 1969

3,436,575
CONDUCTIVE LIQUID METAL TRANSFER MEANS FOR PLURAL CURRENT COLLECTORS
Luke M. Harvey, Schenectady, N.Y., assignor to General Electric Company, a corporation of New York
Filed Sept. 30, 1966, Ser. No. 583,276
Int. Cl. H02k *13/00;* H01r *39/30*
U.S. Cl. 310—219         6 Claims The present invention relates to current collectors utilizing conductive liquid metal and more particularly pertains to means for transferring such liquid between collectors of this kind that are operating at different electrical potentials.

In the operation of conductive liquid metal current collectors, of the kind used in homopolar machines, for example, I have found that the liquid oftentimes transfers, or migrates, within the machine during normal operation from one collector assembly to another. This transfer is particularly noticeable in the case of plural current collectors positioned at different radial distances. In this case, the net transfer tends to be toward the radially outermost collector. The result, over a period of time, is for one collector system to accumulate an excessive quantity of liquid metal while, on the other hand, another collector system becomes correspondingly depleted of liquid metal. It would be highly desirable to provide means for transferring conductive liquid metal from one collector system to another, while at the same time preserving the necessary electrical isolation of the two collector systems.

Accordingly, a principal object of this invention is to provide means for transferring conductive liquid between two systems having different electrical potentials.

Another object is to provide means of the foregoing kind that is responsive to the liquid levels in the systems.

Briefly, in a preferred embodiment of this invention, I provide a sump reservoir communicating with each of two collector systems and electrically insulated therefrom. Means are provided to exchange liquid metal between the sump and either reservoir, but simultaneous exchange is prevented. Preferably, the means are responsive to the quantity of liquid in the reservoirs. By preventing simultaneous exchange, the sump is prevented from becoming part of a short circuit between the collectors and electrical isolation is maintained.

Figure 1:
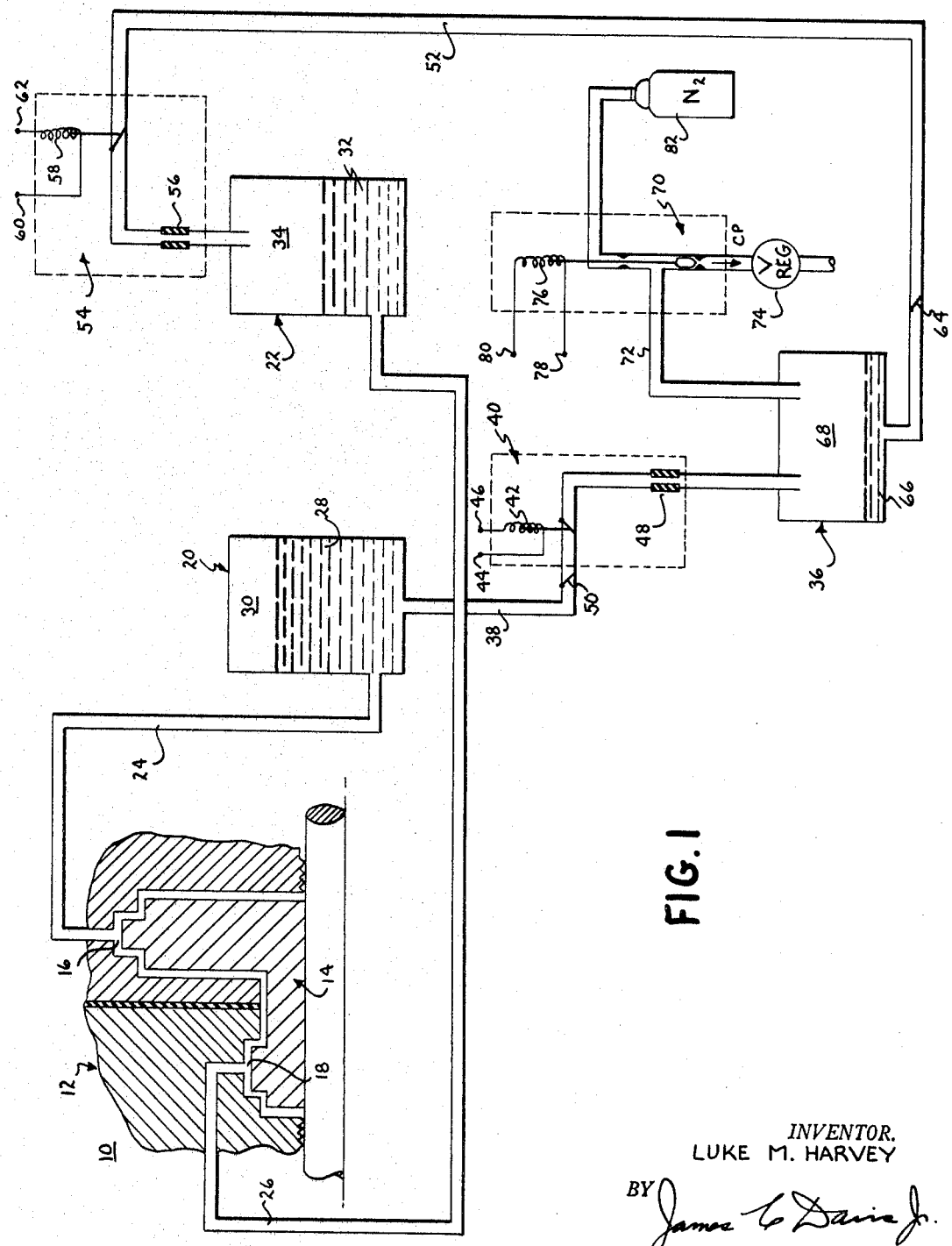
Figure 2:
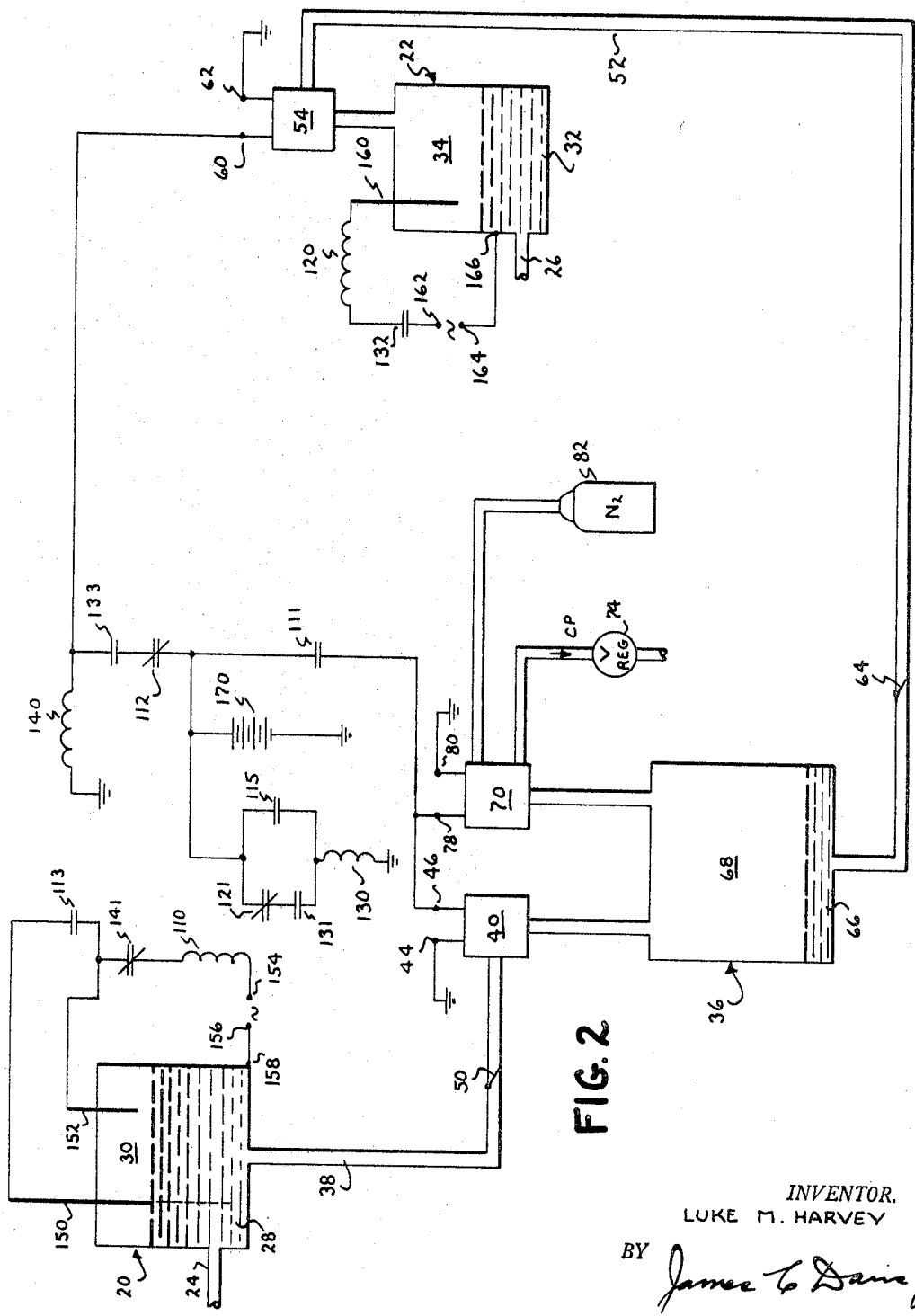

While the specification concludes with claims particularly pointing out and distinctly claiming the subject matter which I regard as my invention, it is believed the invention will be better understood from the following description taken in connection with the accompanying drawings in which:

FIGURE 1 is a schematic representation of the liquid paths in a system in accord with a preferred embodiment of the invention; and FIGURE 2 is a partial schematic representation of the system of FIGURE 1 including a circuit diagram of the presently preferred electric control for use therewith.

The liquid metal transfer system of FIGURE 1 serves a homopolar electric machine, generally indicated at 10, and including a stator 12 and a rotor 14. The machine 10 includes a first current collector 16 and a second current collector 18. Collector 16 is positioned radially outwardly relative to collector 18 and in the usual embodiment means (not shown) are provided to establish an axially oriented magnetic field intermediate the collectors. The principle of operation of the machine shown is that of the well-known Faraday disc and a more detailed description of a particular machine of the kind illustrated is present in my copending patent application Ser. No. 575,863, filed Aug. 29, 1966, and assigned to the assignee of the present invention.

In operation, current collectors 16 and 18 are supplied with a conductive fluid that electrically bridges the respective gaps thereof between the rotor 14 and stator 12. The collectors perform the current transfer function from the rotor to stator and vice versa. The conductive fluid is typically a liquid metal, as mercury or sodium-potassium, for example. The liquid metal is circulated through the collectors individually during operation to provide a convenient heat exchange medium and there can be external pumping means (not shown) for providing forced circulation. In a presently preferred embodiment, the external pumps are obviated and self-pumping liquid metal current collectors are provided that can take the form described in copending patent application Ser. No. 575,859, filed Aug. 29, 1966, and assigned to the assignee of the present application.

Collectors 16 and 18 are provided with external reservoirs 20 and 22, respectively, which are electrically isolated and assume different communicating passages between the collectors and respective reservoirs can take the form of connecting pipelines or conduits, one of which is illustrated for each collector in the illustration and designated 24 and 26 for collectors 16 and 18, respectively. Reservoir 20 contains a charge 28 of conductive liquid and a cover gas 30 that is advantageously inert, as nitrogen, for example, and pressure-regulated to ensure an adequate liquid supply to collector 16 while not flooding or filling the remainder of the space between stator 12 and rotor 14. A net pressure differential in the order of from 3 to 5 p.s.i. gauge is appropriate in most cases to balance the centrifugal pressure in the collector region. In like manner, reservoir 22 contains a charge 32 and cover gas 34.

In accord with the present invention, the system includes a sump 36, electrically insulated from reservoirs 20 and 22, and means for alternatively communicating sump 36 with reservoirs 20 and 22, respectively, for fluid transfer purposes. The communication means between reservoir 20 and sump 36 is shown as including a conduit 38 opening at one end into the bottom of reservoir 20 and opening at the other end into the top of sump 36. An electrically actuatable valve 40 in conduit 38 permits selective communication in response to energization of actuating coil 42 by supplying electric current to the coil terminals 44 and 46. Conduit 38 is conveniently equipped with at least one section 48 fabricated of electrically insulating material, that can be a resin-impregnated glass laminate, for example, in order to establish electrical isolation of reservoir 28 and sump 36 in the usual case where the remainder of conduit 38 is fabricated of conductive metal, as stainless steel, for example. Insulating section 48 can be inside valve 40, as shown, or external thereto and a suitable alternative is to electrically insulate conduit 38 at its coupling into sump 36. A check valve 50 in conduit 38 permits fluid flow from reservoir 28 to sump 36 and prevents flow in the reverse direction, effecting a unidirectional communication.

The communication means from sump 36 to reservoir 22 comprises a conduit 52 opening at one end into the bottom of sump 36 and opening at the other end into the top of reservoir 22. An electrically actuated valve 54 is provided in conduit 52 that includes an insulated section 56 and an actuating coil 58 that establishes communication in response to electrical energization of coil terminals 60 and 62. Valve 54 can be identical to valve 40, as schematically illustrated. A check valve 64 in conduit 52 permits fluid flow from sump 36 to reservoir 22, but blocks reverse flow, to establish a unidirectional communication in response to electrical energization of valve 54.

Selectively operable pumping means is provided to force liquid 66 from sump 36 to reservoir 22 when valve 54 is energized. In the illustrated embodiment, the pumping means comprises means for selectively increasing the pressure of cover gas 68 in sump 36. This is accomplished conveniently by an electrically actuated gas valve 70 having a port 72 in communication with the top of sump 36 and, in response to energization, venting sump 36 to the atmosphere or a scavenger tank, preferably through a constant pressure regulator valve 74. When valve 70 is not actuated, the vent passage is closed and a source 82 of pressurized gas communicates with the interior of sump 36, applying a transfer pressure differential to liquid 66. While the disclosed pumping means has been found to be particularly economical and reliable, it is to be understood that a wide variety of other pumping means can serve as well, including liquid pumps that can incorporate therein the functions of check valve 64 and valve 54 additionally.

In operation, liquid flows from reservoir 20 into sump 36 in response to electrical energization of terminals 44 and 46 and venting of sump 36. The flow is preferably predominantly under the influence of gravity for simplicity, although pumping means can be provided. Toward this end, reservoir 20 is advantageously physically positioned at a higher level than sump 36, as illustrated. Liquid flows from sump 36 to reservoir 22 in response to electrical energization of terminals 60 and 62, and de-energization of terminals 78 and 80, as previously described. The source (not shown) of cover gas 30 and 34 in reservoirs 20 and 22, respectively, is preferably of any of the well known constant pressure regulated kinds to enable the aforementioned liquid transfers under running conditions of machine 10 without otherwise possibly disruptive pressure changes in the reservoirs.

The presently preferred control circuit utilizes electromagnetic relays and is illustrated schematically in FIGURE 2, wherein corresponding components described in connection with FIGURE 1 have the same numerical designations. Four relay energizing coils are shown and designated respectively at 110, 120, 130 and 140. The relay corresponding to coil 110 comprises a single-pole, double-throw section including normally open contact 111 and normally closed contact 112 in break-before-make relationship and a two-pole, single-throw section including normally open contacts 113 and 115, respectively. The relay corresponding to coil 120 comprises a single-pole, single-throw section including normally closed contacts 121. The third relay, corresponding to coil 140 comprises a single-pole single-throw section including normally closed contacts 141.

In order to provide a liquid level sensing means in reservoir 20, there are conveniently positioned therein a low level rod 150 and a high level rod 152. In a preferred embodiment the rods 150 and 152 are merely rigid members of conductive material extending through and electrically insulated from the top surface of reservoir 20. An electrically conductive path from a particular rod to the metal walls of reservoir 20 is established only in the event that the level of charge 28 is sufficiently high to immerse at least the lowest tip of the rod therein. As shown, such a path is established for rod 150 at a lower level of charge 28 than is the case with rod 152, because of the different lengths to which they extend within the reservoir.

An electrical series connection consists of rod 150, contacts 113 and 141, coil 110 and a suitable power supply (not shown) therefor connectable to terminals 154 and 156, and a connection 158 to reservoir 20, all in the order recited. Rod 152 is connected to the junction, or common potential point, of contacts 113 and 141.

The sensing circuit for reservoir 22 comprises a high level rod 160 that can be similar to rod 152. Rod 160, coil 120, contact 132, a suitable power supply for coil 120 connectable to terminals 162 and 164, and a connection 166 to reservoir 22 are all connected in the order recited in series circuit relationship.

The coils 110 and 120 in the sensing circuit are advantageously selected to be energized by a low voltage alternating-current power source of, for example, 12 volts. In this case it is particularly convenient to secure appropriate energy from two separate transformer secondary windings respectively connectable to terminals 154 and 156, and terminals 162 and 164. In this way the necessary electrical isolation of reservoirs 20 and 22 is readily maintained.

The electrically actuated valves 40, 54 and 70, and the coils 130 and 140 are advantageously selected to be suitably energizable by the same power supply 170, that can be a direct-current source, as the battery shown schematically, for example. One convenient voltage level, in the interest of using economical and readily available components, is 24 volts, for example.

In the valve actuation portion of the control circuit, one terminal of power supply 170 is grounded, or connected to the point of common reference potential. Terminal 62 of valve 54 is grounded and terminal 60 thereof is connected through coil 140 to ground and through contacts 133 and 112 in series to the ungrounded side of supply 170. Terminals 44 and 80 of valves 40 and 70, respectively, are grounded and the respective terminals 46 and 78 thereof are connected together and to the ungrounded side of supply 170 through contacts 111. The circuit is completed by a first current path from the ungrounded side of supply 170 to ground through contacts 115 and coil 130 connected in series and a second path wherein contacts 121 and 131 are connected in series with each other and in parallel with contacts 115.

In normal operation, no current flows in the sensing or valve actuating circuits until the need for a liquid metal transfer is sensed. Thus, the transfer system is dormant and does not consume electrical energy until its useful function is required.

The transfer system is responsive to the level of charge 28 in reservoir 20 to initiate a transfer cycle in the event the level thereof reaches or exceeds a predetermined maximum level. More specificially, in the event the level of charge 28 is sufficient for the top surface thereof to make electrical contact with the bottom end of high level sensing rod 152, there is established a closed series loop circuit including normally closed contacts 141, coil 110, the voltage source connected to terminals 154 and 156, charge 28, and rod 152. Energization of coil 110 opens contacts 112 and closes contacts 111, 113 and 115. Contacts 113 serve to sustain energization of coil 110 until the level of charge 28 falls below the lower end of low level sensing rod 150 or until contacts 141 open in response to energization of valve 54 and coil 140. The latter condition is not fulfilled during normal transfer operation, but serves to inhibit simultaneous transfer between both of reservoirs 20 and 22 and sump 36 if an abnormal operation is experienced.

Closing of contacts 111 causes valves 40 and 70 to be energized. The valve 40 thereupon opens to communicate reservoir 20 and sump 36 and the valve 70 vents the cover gas 68 from reservoir 36 to establish a low pressure therein permitting draining of a portion of charge 28 into sump 36. Reduction of pressure in sump 36 further inhibits any transfer to reservoir 22 when valves 40 and 70 are energized even if valve 54 should become defective and energization of valve 54 should become defective and energization of valve 54 is prevented by opening of contacts 112. Thus, means are provided to prevent energization of valve 54 when coil 110 is energized, means are provided to de-energize coil 110 if valve 54 should, nevertheless, become energized and the venting of sump 36 during transfer from reservoir 20 removes the necessary pumping pressure to effect a transfer from sump 36 to reservoir 22 in any event whenever a transfer from reservoir 20 to sump 36 is possible, i.e., the pressure in sump 36 is low enough for the latter to occur. In this way the system is electrically and fluid dynamically interlocked to inhibit the undesirable simultaneous transfer described which would short circuit the machine through the conductive liquid.

Energizing coil 110 closes contacts 115 to energize coil 130 and the latter is sustained by closing of its own associated contacts 131. Contacts 133 are closed in readiness for energization of coil 140 and valve 54, upon de-energization of coil 110 after the liquid level of charge 28 falls below rod 150. Upon the latter occurrence, the second phase of the transfer commences from sump 36 to reservoir 22 in response to closing of contacts 112 and opening of contacts 111. The transfer to reservoir 22 under the influence of increased pressure in sump 36 continues until the level of charge 32 rises to the predetermined level required to make electrical contact with rod 160. Effecting the aforementioned contact energizes coil 120 and contacts 121 open to de-energize coil 130. Contacts 131, 132 and 133 thereupon each open to completely de-energize the system until another similar cycle is required. If, for any reasons, the level of charge 32 does not rise to a sufficient level to terminate the cycle, initiation of another cycle is precluded by the open condition of contacts 141.

The liquid metal transfer system described features simplicity of operation for long, reliable service. The relay logic circuit set forth can be readily duplicated by semiconductive or other electronic components in available or readily derived circuits. The system reliability exceeds that of the electrical control circuit thereof by virtue of the fluid dynamic interlock feature, i.e., when the pressure in sump 36 is relieved to permit transfer from reservoir 20, there is insufficient pressure therein to transfer liquid to reservoir 22 and vice versa. This inhibition of simultaneous transfer is independent of the operation of any associated electrical and mechanical devices so that electrical isolation of the reservoirs is maintained even in the presence of complete failure of any such components.

The foregoing is a description of an illustrative embodiment of the invention, and it is applicant's intention in the appended claims to cover all forms which fall within the scope of the invention.

What I claim as new and desire to secure by Letters Patent of the United States is:

1. A conductive liquid metal current collector system comprising:
    (a) first and second rotary liquid metal current collectors, said first collector being positioned radially outward relative to said second collector and said collectors being at different electrical potentials during normal operation;
    (b) first and second reservoirs for conductive liquid metal in communication with said first and second collectors, respectively;
    (c) a sump for conductive liquid metal in selective communication with both of said reservoirs and electrically insulated from each of said reservoirs; and
    (d) means responsive to the presence of a high liquid level in said first reservoir to transfer liquid therefrom to said sump, means to transfer liquid to said second reservoir from said sump, and means for preventing simultaneous exchange of liquid between both of said reservoirs and said sump.

2. The system of claim 1 wherein said system includes means responsive to the liquid level in said first reservoir to initiate a transfer cycle.

3. The system of claim 2 comprising liquid level sensing means in said first and said second reservoirs.

4. The system of claim 1 wherein said system includes an electrical control network that is responsive to a predetermined high liquid level in said first reservoir to initiate a transfer cycle of liquid metal from said first reservoir to said sump and thereafter from said sump to said second reservoir.

5. The system of claim 4 wherein said electrical control network is interlocked to inhibit simultaneous transfer of liquid metal between said sump and said reservoirs.

6. The system of claim 5 wherein said electrical control network is quiescent and does not consume electrical energy except during said transfer cycle.

References Cited

UNITED STATES PATENTS

| | | | |
|---|---|---|---|
| 3,312,843 | 4/1967 | Krulls | 310—219 XR |
| 3,163,792 | 12/1964 | Sayers | 310—219 XR |
| 2,845,554 | 7/1958 | Schwab | 310—219 XR |
| 2,786,155 | 3/1957 | Sellers | 310—219 XR |
| 2,401,166 | 5/1946 | Kobel | 310—219 XR |

MILTON O. HIRSHFIELD, *Primary Examiner.*

M. O. BUDD, *Assistant Examiner.*

U.S. Cl. X.R.

310—178